March 28, 1967

I. D. VIRONDA ET AL 3,311,341

VALVE SPRING RETAINING MEANS

Filed Dec. 3, 1965

ITALO D. VIRONDA
LELAND W. KIRKPATRICK
INVENTORS

BY *Roy A. Plant*

ATTORNEY

ITALO D. VIRONDA
LELAND W. KIRKPATRICK
INVENTORS

United States Patent Office 3,311,341
Patented Mar. 28, 1967

3,311,341
VALVE SPRING RETAINING MEANS
Italo D. Vironda and Leland W. Kirkpatrick, Battle Creek, Mich., assignors to Federal-Mogul Corporation, Detroit, Mich., a corporation of Michigan
Filed Dec. 3, 1965, Ser. No. 517,498
6 Claims. (Cl. 251—337)

The present application is a continuation-in-part of our co-pending application filed Aug. 14, 1963, Ser. No. 302,139, now abandoned and wherein the invention relates to value return spring retaining means and, in particular, is directed to an improved valve spring retainer of durable construction which greatly facilitates mounting and stabilizing the assembly on an associated valve stem, is not susceptible to permanent deformation, warping and non-uniform wearing in normal use, and provides great lateral or radial stability in the valve stem-retainer assembly while inducing valve stem rotation.

The valves of internal combustion engines of the poppet valve type, including the relatively small utility engines, have heretofore been provided with retainers for the valve return spring associated therewith. Such retainers, in the great majority of instances, have taken the form of a circular opening, centrally apertured, disk threadable on the end of the stem of the valve in position to receive one end coil of the return spring on the flat outer edge portion of same, while a pin inserted in a hole in the valve stem or some other extraneous locking device has been employed to fix the spring retainer on the valve stem in an axial position relative to same. In some engines of more recent design, however, the location of the valves has been such as to make it extremely difficult if not relatively impossible for practical purposes to obtain sufficient access to the valve stems to permit insertion of such pins or like devices to hold the retainer axially on the valve stem with the valve spring in place.

In an effort to solve this problem, Holdsworth, Patient No. 2,523,570, proposed using a slotted spring retainer with a tapered center portion which wedged on a tapered portion of the stem so that the two were locked non-rotatably together, and later it was proposed in the Tauschek et al. Patent No. 3,008,687, of which the present invention is an improvement, to provide a stamped integral valve spring retainer formed of relatively thin sheet metal of uniform thickness having a keyhole slot therein, the small end of which communicates with and forms a central opening extending therethrough, whereby the usual tip end of the valve stem may be inserted through the larger outer portion of the keyhole slot until a neck portion of the stem having a smaller diameter than the tip end thereof enters the slot. Thereafter, the neck portion of the stem may be moved radially inwardly through the narrow portion of the keyhole slot to the central end of the opening in the retainer with the latter then moved endwise toward the tip of the valve stem to loosely and tiltably seat a suitable shallow abutment flange located centrally of the valve retainer axially against a cooperating shoulder on the stem adjacent the tip end thereof. Thus, no pins or like locking devices as aforementioned were required to hold the valve spring retainer axially on the stem since the aforementioned flange and shoulder are normally held in engagement with each other by the force of the valve return spring having one end coil engaged with the retainer.

While a retainer of the two types immediately aforementioned has contributed to minimizing the assembly problems previously occasioned in the art, such retainers do present problems of their own. In the first instance, considerable manual dexterity is still required, particularly with the valve located in a relatively inaccessible position on the engine, to first manipulate the larger tip end of the valve stem through the larger end portion of the keyhole slot followed by radial movement of the retainer relative to the valve stem to finally loosely and tiltably seat the retainer thereon in accordance with Tauschek et al. Secondly, the lack of lateral stability between the retainer on the valve stem, due to the loose fit and tiltability of said shallow abutment flange on said valve stem, leaves much to be desired. More specifically in this regard, while the engine is in operation, the dynamic forces imposed on the valve assembly, particularly with small valves, and valve spring whip, cause the loose fitting and tiltable retainer to be repeatedly cocked or canted relative to the axis of the valve stem, resulting in uneven contact and non-uniform wearing between the cooperably engaging surfaces of the stem and retainer as well as fatigue and danger of breakage of the valve stem adjacent said shoulder. Furthermore, the uniformly thin sheet metal stampings utilized for such valve spring retainers, as discussed above, relatively easily transmit dynamic forces and stresses therethrough, and untimately stresses may be produced within the valve spring retainer exceeding the elastic limit of the stamped material, thereby at the very least causing warping, if not permanent deformation, of the retainer which can adversely influence the normal functioning of the spring and the valve.

In addition, the aforementioned keyhole slot of such prior valve spring retainers has been located entirely within, of course, the body of the valve spring retainer with the seat for an end coil of the valve return spring located radially outwardly thereof, thereby further contributing to lack of lateral stability in the assembly. More specifically, as a result of such a keyhole construction and location, it is possible for the loose fitting and tiltable retainer, under conditions of valve operation, and valve spring whip, to become unseated on the valve stem shoulder and shift laterally or radially of the axis of the valve stem the small distance necessary for the tip end of the valve stem to be axially alined with the larger portion of the keyhole slot, which can result in the valve spring retainer being disengaged from and dropping from the valve stem. Another patent disclosing a thin valve spring retainer with keyhole slot, prior to Tauschek et al., is that of Pitt et al., No. 2,671,436, which is subject to the same difficulties.

Furthermore, particularly with respect to the exhaust valves of an engine, it has been recognized as being desirable to permit the valve stem, and hence the valve head carried thereby, to rotate at least slightly as the engine operates. To this end, special tappets providing a clearance space between the latter and the end of the tip of the valve stem to be engaged thereby have been devised to enable the valve spring retainer to be lifted out of locking engagement with the valve stem prior to engagement of the end of the latter with the tappet for this purpose. It was a recognition of these and other problems in the art which led to the conception and development of the present invention.

In view of the foregoing considerations, the present invention includes among its objects the provision of an improved valve spring retainer which greatly enhances ease of assembly on a cooperating valve stem, promotes substantially tilt free lateral stability therebetween while permitting relative rotation, and otherwise avoids the aforementioned problems as well as others occasioned by the art.

More specifically, it is an object and feature of this invention to provide a valve spring retainer comprising a central axially extending, relatively deep, bearing pocket mountable coaxially of and closely fitting the tip end of a valve stem, a peripheral seating flange adapted to receive and seat an end coil of a valve return spring, and a substantially uniform width slot extending radially completely through the retainer from the edge of such seating flange to the bearing pocket in the center of the retainer, whereby the retainer may be quite easily radially inserted upon the valve stem with the tip end of the latter radially confined and rotatable but substantially tiltless within the aforementioned relatively deep bearing pocket.

In this regard, it is yet another object and feature of this invention to provide a valve spring retainer of the type aforementioned wherein the aforementioned central bearing pocket further includes an annular, radially inwardly projecting, abutment flange at one axial end thereof for axial seating engagement against a corresponding abutment shoulder at one end of the tip end of the stem, whereby the usual valve return spring seated on the peripheral seating flange of the valve spring retainer firmly seats the abutment flange of same against the abutment shoulder of the stem with the relatively deep bearing pocket radially confining therewithin, in substantially tilt-free manner, the external surface of the tip end of the stem.

It is yet another and more specific object and feature of this invention to provide a valve spring retainer of the type aforementioned wherein, due to the fact that the aforementioned slot extends radially completely through one edge of the spring retainer, the spring-seating flange of the latter is discontinuous in nature and provides a discontinuous seat for the cooperating end coil of the usual valve return spring whereby, in operation of the valve assembly, such discontinued seat induces the axially coiled spring to go slightly "out of square" to induce a tendency of the spring to turn in the direction of its coiling and thereby induce valve stem rotation, particularly when the valve stem is momentarily free adjacent the lower end of its travel.

In addition, it is yet another object and feature of this invention to provide a valve spring retainer of the type aforementioned wherein the aforementioned narrow slot in the retainer includes opposed substantially parallel faces extending through and from the outer edge of the spring-seating flange to the central, relatively deep, bearing pocket whereby, even if it were possible under certain operating conditions for the tip end of the stem to become unseated from the bearing pocket aforementioned, the retainer could not slip radially from the valve stem since the latter would ultimately engage and be stopped by the end coil of the spring resting on the seating flange of said valve spring retainer.

It is yet another object and feature of this invention to provide a valve spring retainer of the type aforementioned formed of an integral rigid piece of metal, preferably a machined suitably hardened steel material, which receives and holds the end of the valve stem in a relatively deep, close fitting, pocket which stabilizes same against tilting on the valve stem and effectively resists not only deformation but also deleterious warping of the valve spring retainer in use.

Still further objects, features and advantages of the invention will appear as the description thereof proceeds.

To the accomplishment of the foregoing and related ends, the invention, then, consists of the means hereinafter fully described and particularly pointed out in the claims, the annexed drawings and the following description setting forth in detail certain means for carrying out the invention, such disclosed means illustrating, however, but several of various ways in which the principle of the invention may be used.

Figure 1:
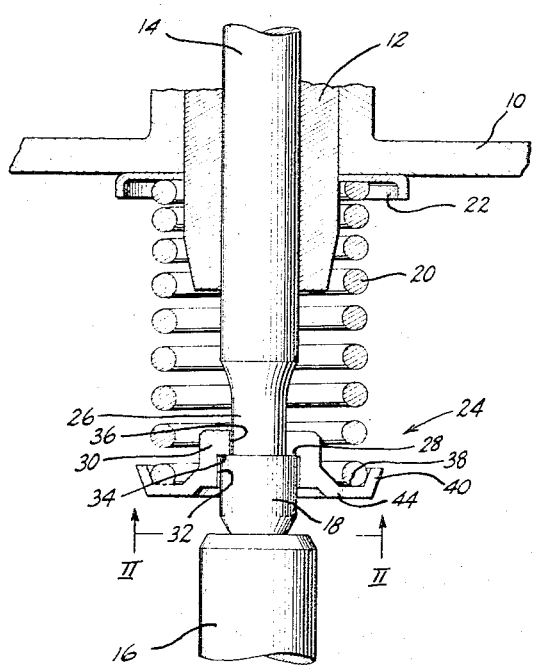
FIGURE 1 is a fragmentary view of a poppet valve assembly of an internal combustion engine, partly in section and with the central pocket of the valve spring retainer enlarged beyond normal to better illustrate certain details, and shows one preferred embodiment of the invention wherein the valve is in a lifted position during the cyclic operation thereof.

Referring now to the drawings, and particularly to FIGURE 1 thereof, the numeral 10 indicates a part of an internal combustion engine mounting a valve stem guide 12 in the usual manner, and in which the valve stem 14 of a valve is mounted for reciprocation axially thereof upon actuation by a tappet 16 engageable with the axially extending cylindrical tip end 18 of the valve stem, as will be readily apparent to those acquainted with this art. One end of an axially coiled valve return spring 20 is seated, as illustrated, against a cup member 22 abutting the engine part 10, while the opposite end of the return spring is seated against the valve spring retainer indicated generally at 24. An axially extending cylindrical neck portion 26 of the valve stem immediately adjacent the tip end 18 of the stem has a reduced diameter so as to preferably define therewith a radially projecting circumferentially extending abutment shoulder 28.

The valve spring retainer 24 is of integral rigid metal construction, preferably of machined steel of suitable hardness, and comprises a central body portion 30 including an axially extending annular internal bearing surface 32 having a diameter just slightly greater, for clearance purposes upon assembly, than the diameter of the external surface of the tip end 18 of the valve stem thus making the valve spring retainer substantially tilt-free in operation. A radially inwardly projecting annular abutment flange 34 formed at one end of the bearing surface 32 includes a radial edge surface 36 having a diameter just slightly greater, for clearance purposes upon assembly, than the diameter of the neck portion 26 of the stem. Thus, and as will be readily apparent from FIGURE 1 of the drawings, with the valve spring retainer 24 assembled in seated position on the stem 14, the edge surface 36 of the abutment flange 34 closely radially confines the neck portion 26 of the stem, while the abutment flange is seated axially against the abutment shoulder 28 with the bearing surface 32 of the pocket closely radially confining the external surface of the tip end 18 of the stem. As a result, the valve spring retainer and stem are closely confined against relative lateral or radial tilting displacement, while the aforementioned abutment shoulder 28 and abutment flange 34 are held in axial seated engagement by valve return spring 20.

Figure 3:
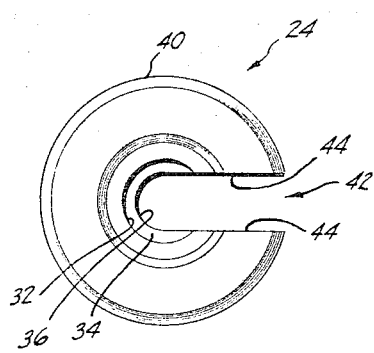
FIGURE 3 is a view generally corresponding to FIGURE 2, but illustrating the improved valve spring retainer removed from the valve.

The valve spring retainer 24 further includes a peripheral radially outwardly projecting annular seating flange 38 axially and radially spaced from the abutment flange 34, and adapted to receive and seat the one end coil of the valve return spring 20 as aforementioned. An annular shoulder 40 or upturned edge portion extends from the flange 38 to receive and centrally confine such end coil of the valve spring on the retainer. An assembly slot indicated generally at 42 in FIGURES 3 and 5 extends radially completely through one side of the valve spring retainer 24, including the shoulder 40 and seating flange 38, to communicate with the central body portion 30 of the retainer. More specifically, such slot includes the opposed parallel wall members 44 which are spaced apart a distance substantially equal to the diameter of edge surface 36 of the annular abutment flange 34 and, hence, a distance just slightly greater for close tolerance clearance purposes than the diameter of the neck portion 26 of the valve stem.

Figure 4:
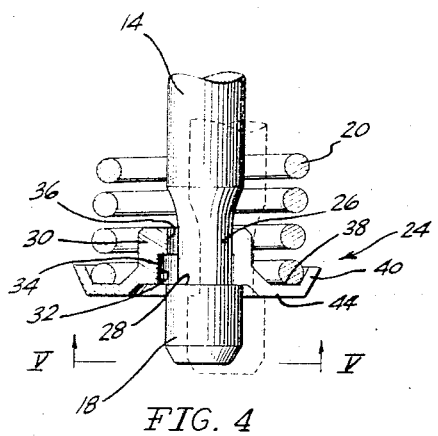
FIGURE 4 is a view of a fragmentary portion of FIGURE 1 and generally corresponds thereto, except for illustrating some of the initial steps in the assembling of the valve spring retainer and valve.
Figure 5:
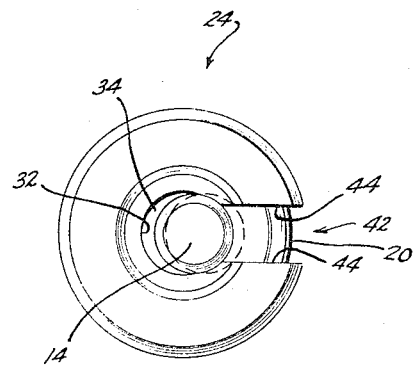
FIGURE 5 is a view taken on line V—V of FIGURE 4, looking in the direction of the arrows.
Figure 6:
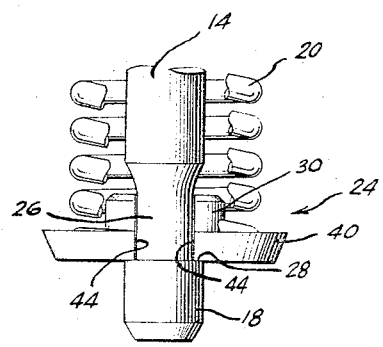
FIGURE 6 is a fragmentary view corresponding generally to the dashed valve stem position shown in FIGURE 4, but 90° out of phase with the latter so as to be looking in the lengthwise direction of the slot in the valve spring retainer.

The installation of the valve spring retainer 24 in an operative seated and stabilized position on the valve stem 14 as shown in FIGURE 1 may be understood by referring additionally particularly to FIGURES 4 through 6. Thus, the valve spring retainer 24 and valve stem 14 may be moved radially relative to each other whereby the neck portion 26 of the valve stem passes initially through the slot 42 of the valve spring retainer radially inwardly beyond the spring seating flange 38 toward the central body portion 30 of the retainer. Upon the neck portion of the stem clearing that portion of the slot passing through the seating flange 38, the associated end coil of the valve return spring 20 may be seated against such flange or after the retainer is entirely seated as desired. In any event, the retainer and valve stem are so moved radially relative to each other until the neck portion 26 of the valve stem abuts the edge surface 36 of abutment flange 34 with the bearing surface 32 of the body portion 30 coaxially aligned with the axis of the tip end 18 of the stem. The valve spring retainer and stem may then be moved axially endwise relative to each other to seat the abutment flange 34 axially against the abutment shoulder 28 under the influence of the valve spring 20 with the bearing surface 32 and edge surface 36 respectively laterally or radially confining the external surface of the tip end 18 and the neck portion 26 of the stem.

As a consequence of this construction, great lateral or radial stability exists between the valve spring retainer 24 and the valve stem 14. In other words, the tip end 18 of the valve stem is closely confined within the body portion 30 of the valve spring retainer, preferably with just enough clearance to permit free relative rotation of the valve and retainer. In this regard, it is to be noted that the axial length of such body portion as defined by the axial length of bearing surface 32 is relatively quite great so as to laterally or radially confine a correspondingly great axial extent of the external surface of the tip end of the valve stem. For example, such axial dimension preferably approximates at least 0.160 inch. As a result, relatively great bearing engagement is provided between the valve spring retainer and the tip end of the valve stem to positively prevent any lateral or radial relative displacement therebetween. In this regard, it is to be particularly noted that the diameter of the tip end of the valve stem is greater than the spacing between the wall members 44 of the assembly slot whereby, with the tip end seated in the central pocket defined by bearing surface 32 of body portion 30 of the valve spring retainer as illustrated in FIGURE 1, relative lateral or radial displacement between the valve spring retainer and the stem is substantially impossible.

Figure 2:
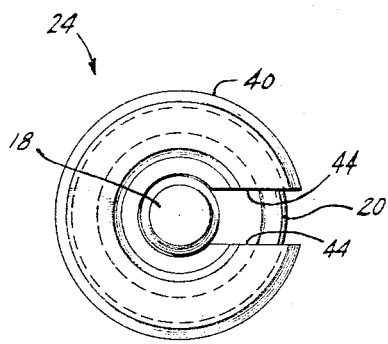
FIGURE 2 is a view taken along line II—II of FIGURE 1, looking in the direction of the arrows.

With particular reference to FIGURES 1 and 2, it may further be noted that a portion of the end coil of the valve spring 20 seated against the seating flange 38 of the valve spring retainer extends across the mouth or peripheral portion of the assembly slot 42. Consequently, even if the valve spring retainer should in some way become unseated from the tip end of the valve stem, it will be readily apparent that the valve stem cannot move out of the assembly slot 42 since it would first engage and be stopped by the end coil of the valve spring.

Furthermore, since the assembly slot 42 extends through a portion of the seating flange 38, the latter is discontinuous in nature in supporting the associated end coil of the spring. As a consequence, such a discontinuous seat for the end coil causes the spring to be slightly biased "out of square" to induce a tendency of the spring to turn in the direction of its coiling, thereby inducing rotation of the valve stem and the poppet valve connected thereto, and which is supplemented by the so-called "spring wind pressure" when the valve is free to turn during part of its travel and which is possible with constructions such as shown in FIGURES 7 and 8.

Furthermore, being of an integral rigid metal construction, such as of machined steel of suitable hardness as compared to a shallow sheet metal stamping, the retainer is not subjected to deformation or deleterious warping or tipping during use and, due to the stabilized seating of the tip end of the valve stem to a considerable extent axially within the pocket of body portion 30 formed by the bearing surface 32 and abutment flange 34 of the retainer, very even and uniform wear results in the coacting engageable parts of the retainer and valve stem.

Finally, in this embodiment of the invention, it will be readily apparent that there is practically no relative axial movement of the valve spring retainer 24 and valve stem 14 during opening and closing of the poppet valve, as shown in FIGURE 1, since the valve return spring 20 firmly holds the abutment flange 34 seated on the abutment shoulder 28.

Figure 7:
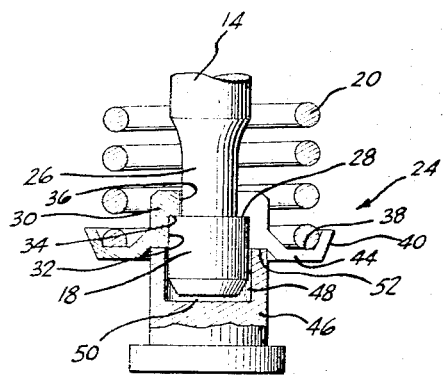
FIGURE 7 is a view corresponding generally to FIGURE 1, but with the valve lowered to seated position and illustrating another embodiment of the invention.
Figure 8:
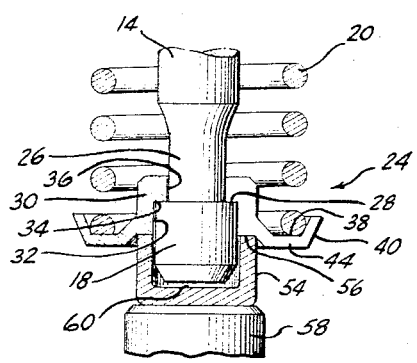
FIGURE 8 is a view likewise corresponding generally to FIGURE 1, but with the valve lowered to seated position and illustrating yet another embodiment of the invention.

Rotation of the valve stem and the associated valve is additionally provided for in the embodiment of FIGURE 7 in which the valve stem 14, valve return spring 20 and valve spring retainer 24 are identical to that previously described and, accordingly, like numerals have been employed to these parts in FIGURE 7. In FIGURE 7, however, a tappet 46 is provided having a substantially cylindrical recess 48 formed in one end thereof. The recess 48 is sized to a diameter just slightly larger than the diameter of the tip end 18 of the valve stem and of a depth calculated to provide a clearance space 50 accommodating slight axial travel of the tappet 46 to release the abutment flange 34 of the valve spring retainer from abutment shoulder 28 of the valve stem before engaging the latter. Pressing contact is made between the tappet and valve spring retainer along a marginal end surface of the tappet and the annular shoulder 52 on the valve spring retainer. When an opening load is applied by the tappet, an axial force is directed thereby against the shoulder 52 of the valve spring retainer to cause a minor amount of axial movement and release thereof from a locked position on the valve stem as aforementioned. The valve stem 14 is thereupon freed for rotation under the influence of the valve return spring 20, as it moderately winds and unwinds under conditions of operation, and inherent vibration in the engine.

Another embodiment is shown in FIGURE 8 wherein the valve stem 14, valve return spring 20 and valve spring retainer 24 are identical to those previously described with respect to the first embodiment, like numerals therefore being again employed to indicate identical parts. In this embodiment, a cup member 54 has an open end portion thereof bottomed against the annular shoulder 56 of the valve spring retainer. A tappet 58 of conventional construction bears against the other end of the cup member 54. The cup member is sized with an inner diameter just slightly greater than the diameter of the tip end 18 of the valve stem 14, and a slight axial clearance space 60 is provided for the purpose described in connection with the embodiment of FIGURE 7. The operation of the cup member 54 during opening and closing of the valve is essentially the same as the construction of FIGURE 7, and accordingly its operation need not be further described.

While several forms of the invention have been shown and described, other forms will now be apparent to those skilled in the art. Therefore, it will be understood that the embodiments shown in the drawings and described above are merely for illustrative purposes, and are not intended to limit the spirit and scope of the invention.

Other modes of applying the principle of our invention may be employed instead of those explained, change being made as regards the valve assembly herein disclosed, provided the means stated by any of the following claims or the equivalent of such stated means be employed.

We therefore particularly point out and distinctly claim as our invention:

1. In a valve assembly having an elongated valve stem terminating in a cylindrical tip, said stem having a reduced diameter portion extending to said tip and defining an abutment shoulder on same normal to the longitudinal axis of said stem, a compression spring about said stem, and a valve spring retainer removably and rotatably mounted on said shoulder and compressibly engaged by one end of said spring, said valve spring retainer having an axially extending central body portion terminating in an outwardly extending annular flange, said body portion having an axial dimension in the direction of the axis of the valve stem substantially greater than the thickness of said flange in the direction of said axis of the valve stem, and having a pocket in the form of an inner, downwardly opening, axial cylindrical bearing portion substantially surrounding more than one-half of the circumference of said stem tip and extending the greater porttion of said axial dimension of said body portion, said bearing portion conforming to the outer surface of said stem tip in a close but free fit which stabilizes said valve spring retainer normal to said valve stem but permits free relative rotation, said bearing portion extending a substantial portion of the length of said tip, said central body portion of said valve spring retainer including an upper abutment flange portion normal to said cylindrical bearing portion and terminating in an arcuate edge and overlying said cylindrical bearing portion, said abutment flange portion engaging said stem abutment shoulder and said arcuate edge engaging one side of said reduced diameter portion of said stem, said annular flange having an upper surface to seat the lower end of said compression spring, said annular flange being normal to said cylindrical bearing portion of said body portion and disposed in axially spaced relation from said abutment flange engaged on said stem shoulder and engaged by one end of said compression spring, said annular flange being disposed under operating conditions in a plane intermediately of said stem tip, said annular flange including an outer annular peripheral shoulder portion extending axially upwardly and outwardly away from the direction toward which said cylindrical bearing opens so as to stabilize said valve spring relative to said valve spring retainer, said valve spring retainer including a portion defining a radial slot having parallel side walls uniformly spaced apart slightly more than the reduced diameter portion of said stem and extending from said arcuate edge continuously outward through one side of said central body portion, annular flange and peripheral shoulder, said retainer being held substantially tilt-free by the close but free fit of said stem tip in said cylindrical bearing portion of said spring retainer through all attitudes of operation while encouraging relative rotation of said stem with respect to said retainer and minimizing stem breakage in the reduced diameter portion of said stem.

2. A valve assembly as set forth in claim 1, wherein said valve spring retainer is stabilized on said valve stem so as to be substantially tilt-free not only by the close but free fitting pocket in the bottom of same which receives and pockets said stem tip, but by the inner arcuate edge surface of said retainer above said pocket and which closely fits the reduced diameter portion of said stem, said pocket and said inner edge surface both being co-axial.

3. A valve assembly as set forth in claim 1, wherein the upper surface of said valve spring retainer on which the lower end of said compression spring rests is substantially co-planar with the bottom of said valve spring retainer pocket which receives and stabilizes the stem end portion of said valve stem.

4. A valve assembly as set forth in claim 1, wherein there is a recessed end means which in its valve actuating upward movement first contacts the under face of said valve spring retainer and then the lower end of said valve stem tip so that said stem is momentarily free to rotate.

5. A valve assembly as set forth in claim 1, wherein said valve spring retainer is stabilized on said valve stem so as to be substantially tilt-free not only by the close but free fitting pocket in the bottom of same which receives and pockets said stem tip, but by the inner arcuate edge surface of said retainer above said pocket and which closely fits the reduced diameter portion of said stem, said pocket and said inner edge surface both being co-axial, and wherein there is a recessed end means which in its valve actuating upward movement first contacts the under face of said valve spring retainer and then immediately the lower end of said valve stem tip so that said stem is momentarily free to rotate.

6. A valve assembly as set forth in claim 5, wherein the upper surface of said valve spring retainer on which the lower end of said compression spring rests is substantially co-planar with the bottom of said valve spring retainer pocket which receives and stabilizes the stem end portion of said valve stem, and wherein the slot which extends from the center of said valve spring retainer through an outer edge of same is a close but slidable fit with the recessed portion of said valve stem, whereby said valve spring retainer, when mounted on said valve stem will be so closely and deeply seated on the stem end of said valve stem as to be not only substantially tilt-free but also free of accidental disengagement.

References Cited by the Examiner

UNITED STATES PATENTS

| 1,329,321 | 1/1920 | Ellis | 251—337 |
| 1,975,699 | 10/1934 | Olson | 123—188 |
| 2,523,570 | 9/1950 | Holdsworth | 251—337 |
| 2,671,436 | 3/1954 | Pitt et al. | 123—188 |
| 2,682,387 | 6/1954 | Gaddoni | 251—337 |
| 3,008,687 | 11/1961 | Tauschek et al. | 251—337 |
| 3,077,874 | 2/1963 | Bush | 251—337 XR |

FOREIGN PATENTS 958,344   2/1957   Germany.

M. CARY NELSON, *Primary Examiner.*

S. SCOTT, *Assistant Examiner.*